United States Patent [19]

Hammersand et al.

[11] Patent Number: 4,506,822

[45] Date of Patent: Mar. 26, 1985

[54] METHOD FOR BRAZING TOGETHER PLANAR AND NONPLANAR METAL MEMBERS

[75] Inventors: Fred G. Hammersand, East Petersburg; Anthony J. Witkowski, Lancaster, both of Pa.

[73] Assignee: The United States of America as represented by the United States Department of Energy, Washington, D.C.

[21] Appl. No.: 359,423

[22] Filed: Mar. 18, 1982

[51] Int. Cl.³ .................... B23K 29/02; B23K 35/12
[52] U.S. Cl. .................... 228/200; 228/220; 228/239; 228/246
[58] Field of Search .................... 228/220, 263.18, 246, 228/254, 239, 240, 200, 222

[56] References Cited

U.S. PATENT DOCUMENTS

| | | | |
|---|---|---|---|
| Re. 29,737 | 8/1978 | Bottum | 228/220 X |
| 2,332,368 | 10/1943 | Burtenshaw | 113/112 |
| 2,398,449 | 4/1946 | Ronci | 113/112 |
| 2,514,976 | 7/1950 | Stivin | 226/20.4 |
| 2,727,834 | 12/1955 | Cape et al. | 228/220 X |
| 2,813,218 | 11/1957 | Klopping et al. | 313/249 |
| 2,984,732 | 5/1961 | Herbert, Jr. | 219/78 |
| 3,012,130 | 12/1961 | Harrison | 219/137 |
| 3,202,792 | 8/1965 | Bukata | 219/85 |
| 3,284,607 | 11/1966 | Wernz et al. | 219/85 |
| 3,482,305 | 12/1969 | Dockus et al. | 29/487 |
| 3,583,063 | 6/1971 | Growney | 29/471.1 |
| 3,608,187 | 9/1971 | Shutt, Jr. et al. | 228/220 X |
| 3,649,803 | 3/1972 | Desmond et al. | 219/85 |
| 3,686,746 | 8/1972 | Gwyn, Jr. | 228/254 X |
| 3,717,743 | 2/1973 | Costello | 219/85 |
| 3,836,745 | 9/1974 | Costello | 219/85 |
| 4,140,266 | 2/1979 | Wagner | 228/183 |

FOREIGN PATENT DOCUMENTS 25280  2/1982  Japan .................... 228/246

OTHER PUBLICATIONS

Metals Handbook, Ninth Edition, vol. 2, p. 11, "Properties of Pure Metals: Tin", American Society for Metals; Metals Park, Ohio, 1981.
Metals Handbook, Eighth Edition, vol. 8, p. 299, "Phase Diagrams of Binary Alloy Systems: Tin", American Society for Metals; Metals Park, Ohio, 1973.

Primary Examiner—Nicholas P. Godici
Assistant Examiner—J. Reed Batten, Jr.
Attorney, Agent, or Firm—L. E. Carnahan; Roger S. Gaither; Judson R. Hightower

[57] ABSTRACT

The invention relates to a method and apparatus for brazing two metal members together, at least one of which is nonplanar, in a brazing furnace using a substantially pure brazing material. The method comprises the steps of utilizing a brazing fixture to hold the two metal members in tangential relation to one another along a portion of each member so that a cavity is formed adjacent to the contacting portions. A braze material is then positioned within the cavity. The braze fixture, the metal members, and the braze material are then placed in a brazing furnace. A heat shield is then placed over the braze fixture, the metal members, and the braze material to shield the braze material from direct furnace radiation. The furnace temperature is linearly increased at a rate of about 180° C. per hour until a temperature of 350° C. is achieved. Heat is transferred by conduction from the metal members to the braze material to cause the braze material to melt. Some material from the metal members slowly diffuses into the braze material forming a braze joint. The furnace is rapidly cooled to room temperature using nitrogen gas. The brazed assemblies made according to this method are superior to assemblies formed by heliarc welding.

4 Claims, 5 Drawing Figures

METHOD FOR BRAZING TOGETHER PLANAR AND NONPLANAR METAL MEMBERS

The government has rights in this invention pursuant to Subcontract Number 6317709 under Contract Number W-7405-ENG-48 awarded by the U.S. Department of Energy.

BACKGROUND OF THE INVENTION

The present invention relates to a method and apparatus for brazing at least two metal members together in a brazing furnace using a substantially pure braze material, at least one of the metal members being nonplanar.

High energy neutral beam sources are gaining significant importance for plasma and other technologies. Neutral beams are particularly useful as a means for adding energy to the plasma in a confining device such as a fusion reactor.

A neutral beam is typically generated by accelerating ions to a desired energy level, and subsequently passing the ion beam through a low energy neutral gas background. Through the process of charge exchange, electrons from the background gas are passed to the high energy ions, thereby neutralizing the beam. More specifically, in an arc chamber assembly, a plurality of filament electrodes are energized to a temperature sufficient to emit electrons. The electrons collide with deuterium gas atoms which are bled into the arc chamber from a plenum chamber and the deuterium atoms are ionized as a result of the aforementioned collisions. The ionized atoms are accelerated to a potential of about 80 kV. The accelerated ions are subsequently neutralized and the neutralized ions drift through the magnetic field confining the fusion plasma to fuel the fusion reaction.

The arc chamber design requires that the deuterium gas be confined within the arc chamber volume. To achieve the desired operating pressures within the arc chamber, it is necessary that the arc chamber electrodes be fabricated in a manner that will retain the temper of the OFHC copper plates used for the electrodes. At the same time, it is necessary to provide a low vapor pressure, high thermal conductivity path between the OFHC copper coolant tubes attached to each of the electrode members to carry away heat generated by filament radiation, electron and ion bombardment and other power losses.

In the prior art, the copper coolant tubes were attached to the copper electrodes using a heliarc welding technique and fillers such as silver-copper brazing rods or copper-tin-phosphorous welding rods. However, because the OFHC copper electrodes are relatively thick and exhibit good thermal conductivity, it is necessary to employ very hot welding arcs to achieve adequate bonds and fillets using this material. As a result, considerable stress and warpage is induced in the copper assemblies joined by these methods. Thus it is desirable to find a method whereby copper cooling pipes may be attached to copper electrodes without inducing stress and warpage into the joined members.

SUMMARY OF THE INVENTION

This invention provides a method and apparatus useful for brazing at least two metal members together in a brazing furnace using a substantially pure braze material. At least one of the metal members is nonplanar. The method comprises the steps of utilizing a brazing fixture to hold the two metal members in tangential relation to one another along a portion of each of the members so that a cavity is formed adjacent to the contacting portions. A braze material is then positioned within the cavity. The brazing fixture, the metal members and the braze material are then placed within a brazing furnace. The brazing fixture, the metal members and the braze material are then substantially enclosed within a heat shield to shield the braze material from direct furnace radiation. The furnace temperature is then increased at a rate sufficient to heat the metal members to the brazing temperature. Heat is transferred from the metal members to the brazing material thereby causing the braze material to melt and form a braze joint in the cavity. The furnace is then rapidly cooled to room temperature.

DETAILED DESCRIPTION OF THE PREFERRED EMBODIMENT

Figure 1:
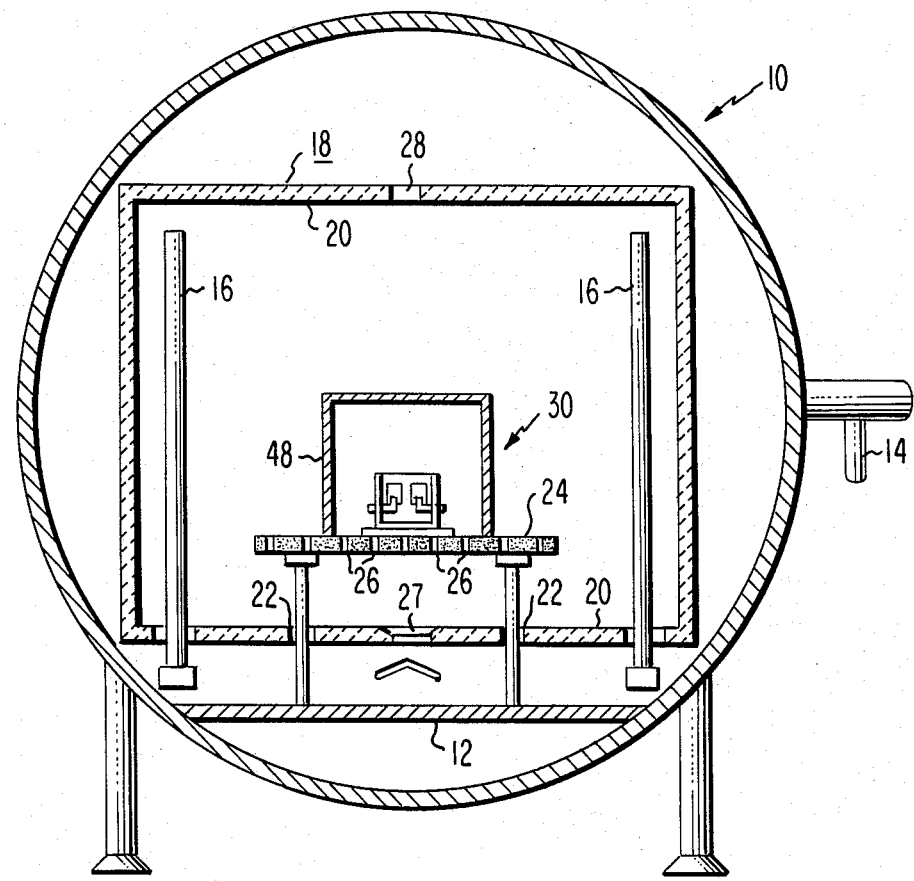
FIG. 1 is a front elevational view of a brazing assembly within a brazing furnace.

Referring to the drawing in detail, wherein like numbers indicate like elements, there is shown in FIG. 1 a brazing furnace designated generally as 10.

The brazing furnace 10 includes a cylindrical housing having a bottom surface 12 which provides support within the furnace 10. A pipe 14 enters the side of the furnace to provide a source of hydrogen and nitrogen gas. A plurality of carbon filament heater rods 16 are disposed in two rows along either side of the brazing furnace 10. The carbon heater rods 16 are enclosed within a box-like structure, hereinafter called a work module 18, which is lined on the inner surface 20 with Grafoil sheets made by Union Carbide Company, New York, New York. The Grafoil sheets provide uniform heat absorption and radiation. A plurality of holes 22 are provided in the bottom surface of the work module 18 to permit the legs of a graphite setter 24 to be positioned within the furnace 10 and supported on the bottom surface 12. The graphite setter 24 is approximately one inch thick and contains a plurality of apertures 26 in the bottom surface thereof to permit nitrogen gas to circulate around the work pieces disposed on the surface of the graphite setter during the quenching step described hereinafter. The work module 18 is also provided with an entrance port 27 in the bottom surface and an exhaust port 28 in the top surface thereof to facilitate the circulation of nitrogen gas through the work module. As so far described, the brazing furnace, the heating structure and the work module are conventional. A brazing apparatus 30 is positioned on the upper surface of the graphite setter 24.

Figure 2:
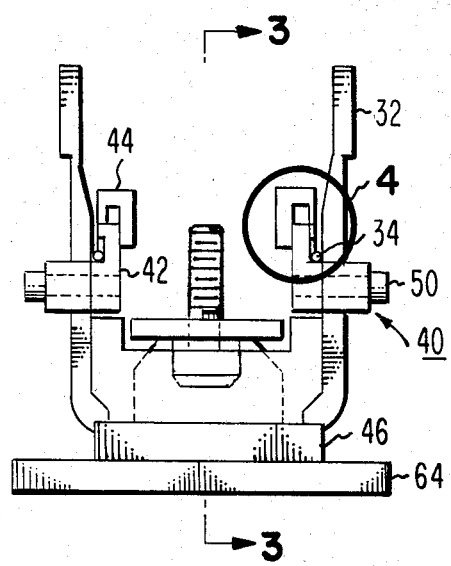
FIG. 2 is a front elevational view of the novel brazing apparatus.
Figure 4:
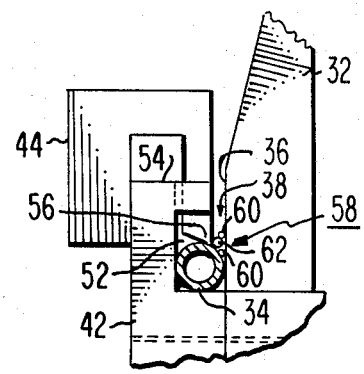
FIG. 4 is an enlarged view of the area within the circle of FIG. 2.
Figure 3:
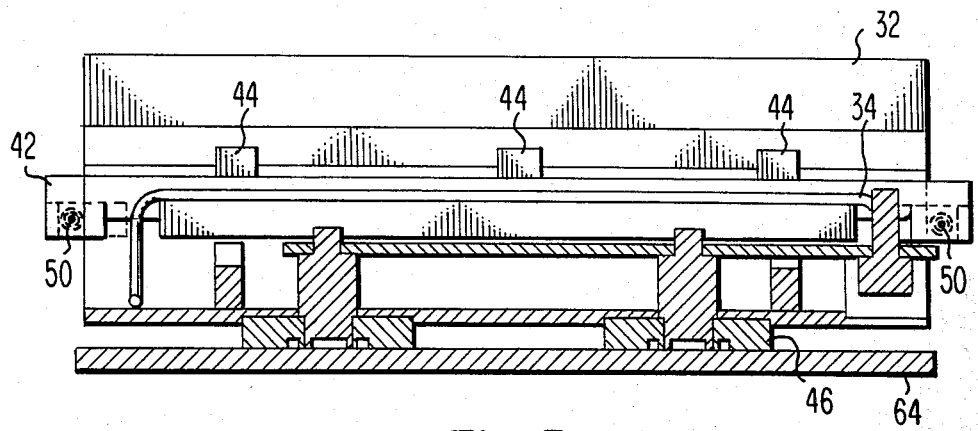
FIG. 3 is a sectional view along lines 3—3 of FIG. 2.
Figure 5:
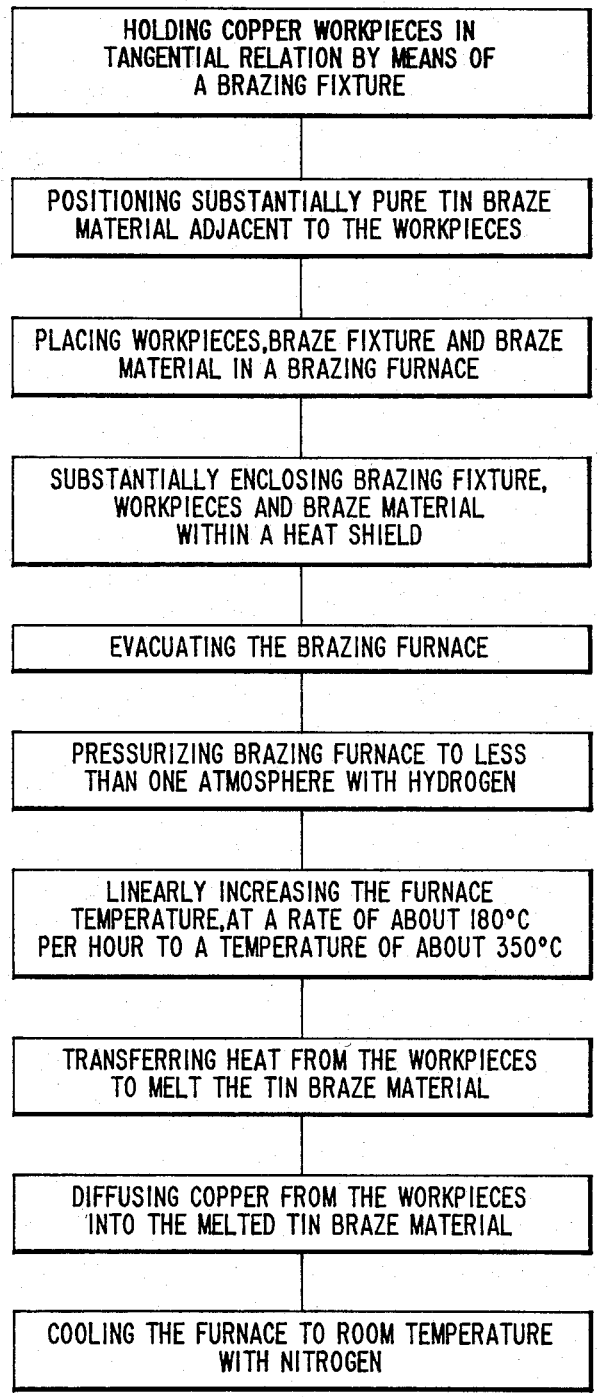
FIG. 5 is a flow chart describing the steps of the novel brazing method.

With reference to FIGS. 2 through 4, a portion of the brazing apparatus 30 is shown in greater detail. The work pieces comprise an OFHC copper electrode 32 and an OFHC copper cooling pipe 34. The work pieces 32 and 34 comprise a portion of an arc chamber for a neutral beam source (not shown). The cooling pipe 34 contacts and extends along a planar portion 36 of the electrode member 32. The cooling pipe 34 and the electrode 32 are in tangential relation and form a cavity 38 adjacent to the area of contact.

The brazing apparatus 30 includes a brazing fixture 40 comprising a substantially L-shaped support member 42, a plurality of U-shaped positioning members 44 and a support base 46. A shielding member 48 (shown in FIG. 1) completes the brazing apparatus 30. The support member 42 is attached to the electrode 32 by means of a pair of bolts 50 at either end of the support member 42. The L-shaped support member 42 forms a channel 52 with the electrode 32 which permits the copper cooling pipe 34 to be held in tangential relation to the planar brazing surface 36 of electrode 32. The positioning members 44 are detachably attached to a lip 54 of the support member 42 and contact the cooling pipe 34 as shown in FIG. 4. The positioning members 44 include a guiding edge 56 which maintains the position of the braze material in the cavity 38 formed adjacent to the area of tangential contact. In the preferred embodiment, the electrode 32 has a wall thickness of about 6.35 mm in the area of the braze joint. The copper tubing 34 has an outside diameter of 3.175 mm and a wall thickness of about 0.8113 mm. A substantially pure, single element braze material 58 such as tin is disposed within the cavity 38. Tin has a melting point of about 232° C. In the preferred embodiment, the braze material comprises three tin wires which are used to provide a sufficient amount of tin to effect the braze and produce a fillet which will provide good thermal conductivity between the electrode 32 and the cooling pipe 34. Preferably, two thin tin wires 60 and a thicker tin wire 62 are disposed in the cavity 38 to form the braze. The tin wires 60 are typically about 1.016 mm in diameter while the tin wire 62 is typically about 1.575 mm in diameter.

In order to form the braze, the coolant pipe 34 is disposed adjacent to the electrode 32 and retained in tangential relation therewith by the suppport member 42 which is affixed to the electrode 32 by means of bolts 50. The coolant pipe 34 is supported within the channel 52 formed between the support member 42 and the electrode 32. The support member 42 also assists in shielding the braze material 58 from direct furnace radiation during the brazing operation. The U-shaped positioning members 44 are then disposed over the lip 54 of the support member 42. The braze wires 60 and 62 are then positioned in the cavity 38 adjacent to the area of contact between the electrode members 32 and the cooling pipe 34. The brazing fixture 40, the electrode 32, and the cooling pipe 34 are then placed on a copper support plate 64, having a thickness of about 12.7 mm and the entire assembly is placed on the graphite setter 24. The shielding member 48 is positioned over the brazing fixture 40 holding the cooling pipe 34, the electrode 32 and the brazing material 58 in a manner which will substantially enclose the aforementioned elements. The shielding member 48 is preferably made of stainless steel and has a thickness of about 0.813 mm. The outside surface of the shielding member 48 is highly reflective to provide slow and uniform heating of the assembly therein. With the brazing apparatus 30 positioned on the graphite setter 24, the furnace is sealed, evacuated, and backfilled with a hydrogen atmosphere of about 4,000 to 5,000 microns and the temperature of the furnace is linearly increased at a rate of about 180° C. per hour until a temperature of about 350° C., as measured on electrode 32, is obtained. The braze is effected by transferring heat, by conduction, from the work pieces 32 and 34 to the braze material 58. The furnace is then quenched, or rapidly cooled to room temperature, by introducing nitrogen through the pipe 14 into the brazing furnace. The rapid cooling and relatively low brazing temperature avoids annealing of the copper electrode 32. The brazing parameters of rate of temperature increase, brazing temperature, furnace pressure, and atmosphere may be varied according to the thickness and composition of the work pieces and the type of braze material.

It has been determined through photomicrographic analysis of brazed joints formed by the above-described process that copper from the electrode 32 and the cooling pipe 34 diffuses slowly into the melted tin braze material to form a braze joint that is significantly stronger than a pure tin braze joint. As a result of the slow copper diffusion into the tin, the liquidus temperature of the tin-copper solution is not significantly increased by the brazing process. Additional copper diffusion into the melted tin which would increase the liquidus temperature of the tin-copper solution can be achieved, however, by increasing the holding time at the 350° C. temperature level. Tensile tests indicated that braze joints made by the above schedule can withstand about 10,000 to 15,000 pounds per square inch (psi). This brazing schedule produces large braze fillets which fill the space between the copper tubing 34 and the electrode 32 and thus provides good thermal conductivity between these elements. Braze joints made by the abovedescribed process, i.e., having copper diffuse into the tin braze material, avoid the problem of crystal structure transformation at about 14.4° C. which is reported in the literature and which produces a weakened crystal structure in pure tin braze joints. Metallographic tests of the OFHC copper parts brazed by the above process do not exhibit such transformations and it is theorized that sufficient copper diffuses into the tin braze material to form a structure which inhibits crystal transformation.

Brazed assemblies made according to the above procedure show significantly less warpage than assemblies formed by heliarc welding the cooling pipe to the electrode surface. In addition, temper measurements on the OFHC copper parts show negligible temper reduction resulting from the low temperature brazing process. To maintain the desired temper, it is necessary that the furnace temperature not exceed 400° C. The tin brazing process can thus be used to form braze joints which exhibit good thermal conduction, large fillets for good heat transfer between the cooling coils and the electrodes and a low vapor pressure which is compatible with electron emitting devices and vacuum environments.

What is claimed is:

1. A method of brazing a copper coolant pipe to a surface of a copper electrode using at least one filament of substantially pure tin braze material to form a braze joint, said brazing being performed within a brazing furnace, the method comprising the steps of:

utilizing a brazing fixture to hold said copper coolant pipe in tangential relation to a portion of said surface of said copper electrode so that a cavity is formed adjacent to said portion;

positioning said tin braze material within said cavity;

placing said brazing fixture together with said coolant pipe, said electrode and said braze material upon a graphite setter within said brazing furnace;

substantially enclosing said brazing fixture holding said coolant pipe, said electrode and said braze material within a heat shield, said heat shield and said brazing fixture shielding said braze material from direct furnace radiation;

evacuating said brazing furnace and pressurizing said furnace to less than atmospheric pressure with hydrogen;

linearly increasing said furnace temperature at a rate of about 180° C. per hour to a temperature of about 350° C. to uniformly heat said copper coolant pipe and said copper electrode to a temperature in excess of the melting temperature of said tin braze material;

transferring heat from said copper coolant pipe and said copper electrode to melt said tin braze material;

diffusing copper from said copper pipe and copper electrode into the melted tin braze material to form said braze joint thereby inhibiting a crystal structure transformation of said braze joint; and rapidly cooling said furnace to room temperature using a nitrogen atmosphere thereby avoiding the annealing of said copper electrode.

2. A method of brazing a copper coolant pipe to a surface of a copper electrode using at least one filament of substantially pure tin braze material to form a braze joint, said brazing being performed within a brazing furnace, the method comprising the steps of:

holding said copper coolant pipe in tangential relation to a portion of said surface of said copper electrode thereby forming a cavity therebetween;

positioning said filament of tin braze material within said cavity;

shielding said braze material from direct furnace radiation;

exposing said coolant pipe, copper electrode and braze material to a hydrogen atmosphere;

linearly increasing the furnace temperature at a rate of about 180° C. per hour to about 350° C.; and cooling said furnace to room temperature by introduction of a nitrogen atmosphere.

3. The method of claim 2, wherein the step of linearly increasing the furnace temperature causes melting of said tin braze material and diffusing copper into the melted tin braze material to form a tin-copper braze joint.

4. The method of claim 2, wherein the at least one filament of tin braze material consists of a plurality of wires composed of pure tin.

* * * * *